Patented Nov. 28, 1939

2,181,481

UNITED STATES PATENT OFFICE 2,181,481

COMPOSITION FOR LINERS

Daniel M. Gray, Wheeling, W. Va., assignor to Hazel-Atlas Glass Co., Wheeling, W. Va., a corporation of West Virginia No Drawing. Application September 16, 1930, Serial No. 482,380

5 Claims. (Cl. 260—28)

This invention relates to improvements in flexible synthetic vinyl ester resin compositions, which may be shaped or molded into suitable forms, and also may be used to coat and saturate paper or other porous fibrous material for use as liners for cans in which food products are to be placed, and also for bottle caps and similar uses, and also as a corrosion resisting varnish or lacquer.

An object of the invention is to provide a synthetic resin composition that is flexible, and that is not "tacky".

A further object of the invention is to provide a flexible non-tacky synthetic resin lacquer composition that is resistant to the corrosive action of food juices, food acids, and other substances in foods which are corrosive to metals.

Another object of the invention resides in the provision of a flexible non-tacky synthetic composition that may be molded into suitable shapes, and mechanically shaped by pressing, rolling, etc., into sheets, rods, or other desired forms, that will be tough and not readily broken.

Other objects of the invention will be apparent to those skilled in the art.

The preferred synthetic vinyl ester resin contains for example vinyl acetate, vinyl chloride, and mixtures thereof, with suitable plasticizers, such as tricresyl phosphate, ethyl abietate, dibutyl phthalate, etc. The composition also contains an agent which may be called a "lubrifier", the function of which is to make it possible to add sufficient plasticizer to make the product flexible without being "tacky", and to increase its spreading power. Among "lubrifiers" which are operative in this invention, depending upon the use to which the final product is to be applied, are petrolatum (petroleum jelly), mineral oils, vegetable oils, such as palm oil and castor oil, various stearates, oleates, palmitates, and the like, of alkali and alkaline earth metals and the like; also such waxes as beeswax, spermaceti, carnauba, paraffin, ceresin, palmitic acid, stearic acid, and others. The "lubrifier" overcomes the natural tackiness which some plasticized films of vinyl resins possess; and, of course, gives added moisture resistance. Wherever the term "lubrifier" appears in the specifications or claims it is intended to include any of the substances mentioned above. Of the above, petrolatum has been found to be very satisfactory and is preferred for many uses.

The product may vary to some extent in composition, without departing from the scope of the invention. Copolymers of the vinyl esters, vinyl acetate and vinyl chloride, are available commercially, and may contain from ten per cent to ninety per cent of one of these compounds, the remainder being the other. A preferred copolymer vinyl resin contains about eighty per cent of vinyl chloride and about twenty per cent vinyl acetate.

Suitable compositions of the product may contain the following:

| | Parts by weight |
|---|---|
| Copolymer vinyl resin (containing from 70 to 85 per cent vinyl chloride) | 14 –17 |
| Plasticizer (tricresyl phosphate) | 4 – 6 |
| Blending agent (petrolatum) | 0.35– 0.6 |
| Solvent (ethylene dichloride) | 50 –85 |

A suitable solution of the composition, constituting a lacquer, for use in saturating fibrous materials, such as paper and the like, is made as follows:

| | Parts by weight |
|---|---|
| Copolymer vinyl resin (80 per cent vinyl chloride) | 15.8 |
| Tricresyl phosphate | 4.75 |
| Petrolatum | 0.45 |
| Ethylene dichloride | 79.00 |

The several ingredients are weighed out and dissolved in a suitable solvent, for example ethylene dichloride, or in other equivalent solvents, on a hot water bath with stirring. The several ingredients may be dissolved in any desired order or simultaneously in the solvent; the completed solution should contain all of the components, and has been found to be an excellent varnish or lacquer for protecting metals, and other materials, from corrosion by weak acids, alkalies, food juices, brines, and for other purposes.

For saturating or coating fibrous products such as a good grade of paper, the solution just described may be at about 75° F. and the fibrous material, such as paper, or the like, is slowly drawn through the solution at a rate of about three feet per minute. The saturated or coated paper, or similar material, then enters the bottom of an air-drying tower, with the bottom of the tower at a temperature from about 70° F. to about 100° F., and the top of the tower at about 140° F., the heated air entering at the top. The time for the first drying is about 2½ minutes. The partially dried paper, or other material, then passes to the top of a second tower, the paper traveling downwards therethrough, with a temperature at the top of the tower about 160° F. and at the bottom of the tower about 230°

F., with the heated air entering at the bottom. The time for the second drying is about 1½ minutes and the entire drying operation should be completed in about four minutes to avoid decomposition of the vinyl esters. The product is usually then baked at about the fusion point of the resin, which varies but is about 270° F., for about one-half minute. The product is then cooled, and, if desired, it may be passed through calender rolls, and then suitably coiled on rolls, or otherwise. The total quantity of lacquer deposited on the paper or other material treated will vary with the quality of the paper, or material used, and also the thickness desired, and a number of other factors.

If it is desired to make masses of the product, the components are dissolved in a smaller quantity of solvent than indicated above, with stirring, and the solvent is then evaporated. The resulting mass may be shaped by suitable presses, rolls, into desired forms.

From the foregoing description it will be apparent to those skilled in the art that I have developed a new synthetic resin composition peculiarly adapted for use as a coating for jar liners as well as for the molding of various articles. It is sufficiently flexible for the purposes intended, and capable of being readily spread on paper sheets. It is also non-tacky, and resistant to food juices, food acids, and other substances.

I have described above what I now believe to be the preferred liner and coating composition as well as the method of preparing the same. Various minor changes may be made without departing from the spirit of the invention, and it is intended that all such changes be included within the scope of the appended claims.

What I claim is:

1. A flexible non-tacky vinyl ester resin composition comprising:

| | Parts by weight |
|---|---|
| Polymerized vinyl ester resin | 14 –17 |
| Tricresyl phosphate | 4 – 6 |
| Petrolatum jelly | 0.35– 0.6 |

2. A flexible non-tacky vinyl ester resin product comprising:

| | Parts by weight |
|---|---|
| Polymerized vinyl ester resin | 14 –17 |
| Plasticizer | 2 – 6 |
| Wax | 0.10– 0.6 |

3. A solution of a flexible non-tacky vinyl ester resin composition comprising:

| | Parts by weight |
|---|---|
| Polymerized vinyl ester resin | 14 –17 |
| Tricresyl phosphate | 4 – 6 |
| Petrolatum jelly | 0.35– 0.6 |
| Ethylene dichloride | 50 –85 |

4. A flexible non-tacky vinyl ester resin product comprising:

| | Parts by weight |
|---|---|
| Polymerized vinyl ester resin | 15.8 |
| Tricresyl phosphate | 4.75 |
| Petrolatum jelly | 0.45 |

5. A flexible non-tacky vinyl ester resin lacquer comprising:

| | Parts by weight |
|---|---|
| Polymerized vinyl ester resin | 15.8 |
| Tricresyl phosphate | 4.75 |
| Petrolatum jelly | 0.45 |
| Ethylene dichloride | 79.00 |

DANIEL M. GRAY.

---

CERTIFICATE OF CORRECTION.

Patent No. 2,181,481. November 28, 1939.

DANIEL M. GRAY.

It is hereby certified that error appears in the printed specification of the above numbered patent requiring correction as follows: Page 2, first column, line 6, strike out the word "usually" and insert the same after "is" in line 7; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.